(12) United States Patent
Morishita et al.

(10) Patent No.: US 10,508,728 B2
(45) Date of Patent: Dec. 17, 2019

(54) RESIN SIDE COVER FOR TRANSMISSION CASE

(71) Applicants: TOYOTA JIDOSHA KABUSHIKI KAISHA, Toyota (JP); AISIN AW CO., LTD., Anjo (JP)

(72) Inventors: Hirofumi Morishita, Anjo (JP); Hirofumi Ota, Toyota (JP)

(73) Assignees: TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 246 days.

(21) Appl. No.: 15/647,759

(22) Filed: Jul. 12, 2017

(65) Prior Publication Data

US 2018/0031106 A1 Feb. 1, 2018

(30) Foreign Application Priority Data

Jul. 29, 2016 (JP) ................................. 2016-149711

(51) Int. Cl.
| | | |
|---|---|---|
| *F16H 57/031* | (2012.01) | |
| *B29D 24/00* | (2006.01) | |
| *B29D 99/00* | (2010.01) | |
| *B65D 85/06* | (2006.01) | |
| *F16H 57/032* | (2012.01) | |
| *F16H 57/02* | (2012.01) | |

(52) U.S. Cl.
CPC ......... *F16H 57/031* (2013.01); *B29D 24/005* (2013.01); *B29D 24/008* (2013.01); *B29D 99/0021* (2013.01); *B65D 85/06* (2013.01); *F16H 57/032* (2013.01); *B65D 2585/6867* (2013.01); *F16H 2057/02043* (2013.01)

(58) Field of Classification Search
CPC ................. F16H 57/031; F16H 57/032; F16H 2057/02043; B29D 24/008; B29D 24/005; B29D 99/0021; B65D 85/06; B65D 2585/6867; B60Y 2306/01
See application file for complete search history.

(56) References Cited

U.S. PATENT DOCUMENTS

| | | | | |
|---|---|---|---|---|
| 2004/0031352 | A1* | 2/2004 | Okuno .................. | F16H 57/027 74/606 R |
| 2009/0241727 | A1* | 10/2009 | Uozumi ................ | F16H 57/025 74/606 R |
| 2013/0112039 | A1* | 5/2013 | Hanna .................... | B22D 17/00 74/606 R |
| 2015/0184562 | A1* | 7/2015 | Sato .................... | F01M 11/0004 184/106 |
| 2017/0074219 | A1* | 3/2017 | Nola ..................... | F02M 35/104 |

FOREIGN PATENT DOCUMENTS

JP 2015-175519 10/2015

* cited by examiner

*Primary Examiner* — James A English
(74) *Attorney, Agent, or Firm* — Oblon, McClelland, Maier & Neustadt, L.L.P.

(57) ABSTRACT

In a transmission case mounted on a FF type vehicle, the transmission case includes a resin side cover formed at a front side of the vehicle. The resin side cover constitutes a vehicle front side surface section of an oil storage section configured to store oil in the transmission case, and includes a protrusion disposed above an oil surface of the oil stored in the oil storage section and protruding toward the front side of the vehicle to constitute the foremost section of the transmission case and a fragile section disposed between the protrusion and the oil surface of the oil and extending transversely in a lateral direction.

10 Claims, 5 Drawing Sheets

RESIN SIDE COVER FOR TRANSMISSION CASE

INCORPORATION BY REFERENCE

The disclosure of Japanese Patent Application No. 2016-149711, filed on Jul. 29, 2016, including the specification, drawings and abstract is incorporated herein by reference in its entirety.

BACKGROUND

1. Technical Field

The present disclosure relates to a transmission case such as an automatic transmission or the like, and more particularly, to a resin side cover configured to close one side surface of a transmission case.

2. Description of Related Art

In general, an automatic transmission is accommodated in a transmission case constituted by joining a plurality of case members. One side end of the transmission case is covered by a side cover, and for example, a valve body (control valve) or the like in which a plurality of valves are installed and an oil path is formed is accommodated in the side cover.

While the side cover configured to cover the one side end of the automatic transmission in a direction perpendicular to an axis of a rotary shaft is conventionally formed of a metal such as steel plate or the like, it has been proposed to use a synthetic resin as a material to satisfy requirements such as reduction in weight and improvement of a degree of freedom in a shape in recent times. In this case, since a synthetic resin side cover has a strength that is inferior to that of a metal, a synthetic resin side cover disclosed in Japanese Patent Application Publication No. 2015-175519 (JP 2015-175519 A) is configured to have reinforced ribs formed of a synthetic resin and having consecutive hexagonal shapes (a honeycomb shape) protruding from an inner surface with respect to a wall surface extending in an upward/downward direction to secure required strength.

In the synthetic resin side cover disclosed in JP 2015-175519 A, a predetermined strength is maintained by the reinforced ribs having a honeycomb shape.

SUMMARY

Incidentally, when an automatic transmission is mounted on a front engine and front wheel drive (FF) type vehicle, as the synthetic resin side cover is disposed at a front end portion of the transmission case, the synthetic resin side cover may be damaged first when the vehicle collides with certain obstacles. If the side cover is damaged in this way, when a broken portion due to the damage is lower than an oil surface of oil (ATF) stored in the transmission case, the oil may lead from the broken portion, which is not preferable.

In general, in a resin product, it is known that, when a large stress is applied to a certain portion due to a collision with a rigid obstacle, damage starts from the collision portion with a large stress, and a rupture (a crack) is generated. The direction of the crack varies depending on the type of resin being used and is not necessarily constant. Accordingly, in the resin side cover disposed at the front end portion of the transmission case, when the side cover is damaged and cracked due to collision of the vehicle, if the direction of a crack is an upward/downward direction in the vehicle, i.e., an upward/downward direction in the side cover and a tip of the crack extends to a portion lower than an oil surface of the oil, the oil may leak.

Here, the present disclosure provides a resin side cover for a transmission case capable of suppressing leakage of oil when a crack is generated in the side cover.

A resin side cover for a transmission case according to an aspect of the present disclosure is configured to be disposed on a transmission case mounted on a vehicle at a front side of the vehicle. The side cover constitutes a vehicle front side surface section of an oil storage section configured to store oil in the transmission case. The side cover includes i) a protrusion disposed above an oil surface of the oil stored in the oil storage section, the protrusion protruding toward the front side of the vehicle and constituting the foremost section of the transmission case; and ii) a fragile section disposed between the protrusion and the oil surface of the oil, the fragile section extending transversely in a lateral direction.

Here, the fragile section may be a convex section having a shell shape protruding from a wall surface of the side cover to a predetermined height.

In addition, the fragile section may be a concave section having a shell shape recessed in a wall surface of the side cover to a predetermined depth.

Further, the shell-shaped convex section or the shell-shaped concave section may have a rectangular parallelepiped shape.

Further, the side cover may include reinforced ribs on a wall surface of the side cover, and the fragile section may have a flat wall surface on which the reinforced ribs are not formed.

Here, the fragile section may have a rectangular shape when seen in a front view.

Further, the protrusion may be an apex section of a dome.

The resin side cover according to the aspect of the present disclosure is configured to be disposed on the transmission case mounted on a vehicle at a front side of the vehicle. The side cover constitutes the vehicle front side surface section of the oil storage section configured to store oil in the transmission case. The side cover includes i) the protrusion disposed above the oil surface of the oil stored in the oil storage section, the protrusion protruding toward the front side of the vehicle and constituting the foremost section of the transmission case; and ii) the fragile section disposed between the protrusion and the oil surface of the oil, the fragile section extending transversely in the lateral direction. Accordingly, when the vehicle collides with certain obstacles, the protrusion is damaged first and breaks, and a crack may be generated from the broken portion. However, even when a direction of a crack is an upward/downward direction in the side cover, since stress is distributed in the lateral direction perpendicular to the upward/downward direction by the fragile section disposed between the protrusion and the oil surface of the oil and extending transversely in the lateral direction, further advance of the crack in the downward direction is blocked. As a result, the crack does not extend to a portion lower than the oil surface of the oil, and leakage of the oil is suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to the accompanying drawings.

Figure 1:
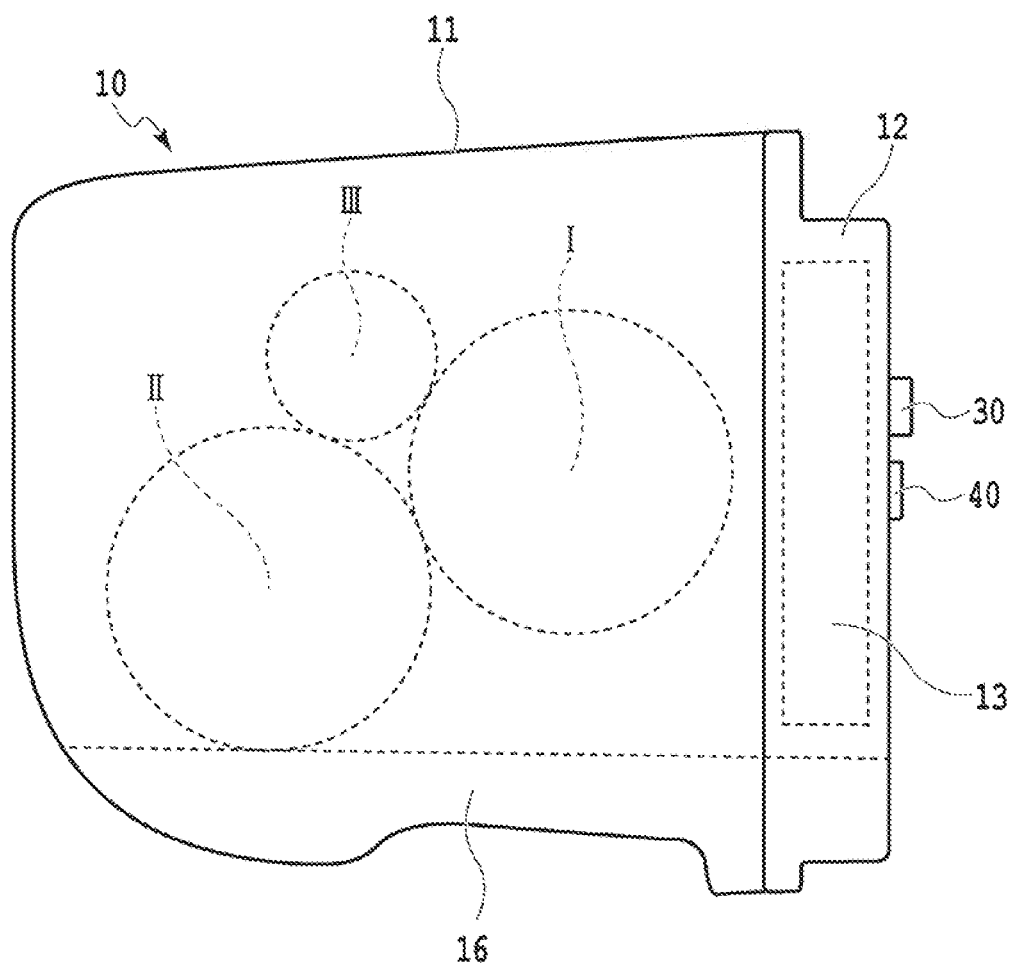
FIG. 1 is a side view schematically showing a transmission case of an automatic transmission to which a side cover according to an embodiment is applied.

As shown in FIG. 1, a front engine and front wheel drive (FF) type automatic transmission 10 according to the embodiment has a first shaft I having a gear shift mechanism constituted by a plurality of frictional elements such as a planetary gear, a clutch, a brake, and so on, a second shaft II having a differential apparatus, and a third shaft III having an intermediate gear, and the first shaft I, the second shaft II and the third shaft III are disposed in parallel and supported by a transmission case 11 to which a plurality of case members are joined. A side cover 12 that constitutes a vehicle front side surface section is integrally fixed to a front side portion (a front end, a right side in FIG. 1) of the transmission case 11 with respect to a direction in which the vehicle advances, and a valve body (a control valve) 13 is accommodated in the side cover portion. The valve body 13 is constituted by, for example, two block-shaped members having grooves that constitute a hydraulic circuit, configured by joining the block-shaped members in a state in which a plurality of valves are mounted, and adjusts a hydraulic pressure from an ejection port of a hydraulic pump as a line pressure and a lubricating oil pressure such that the adjusted hydraulic pressure is applied to a hydraulic servo and lubrication sections of frictional elements of the automatic transmission. The inside of the side cover 12 in which the valve body 13 is accommodated has at least a lower portion communicating with the transmission case 11, and some of oil 16 stored in an oil storage section below the transmission case 11 extends inside the side cover 12.

Figure 2:
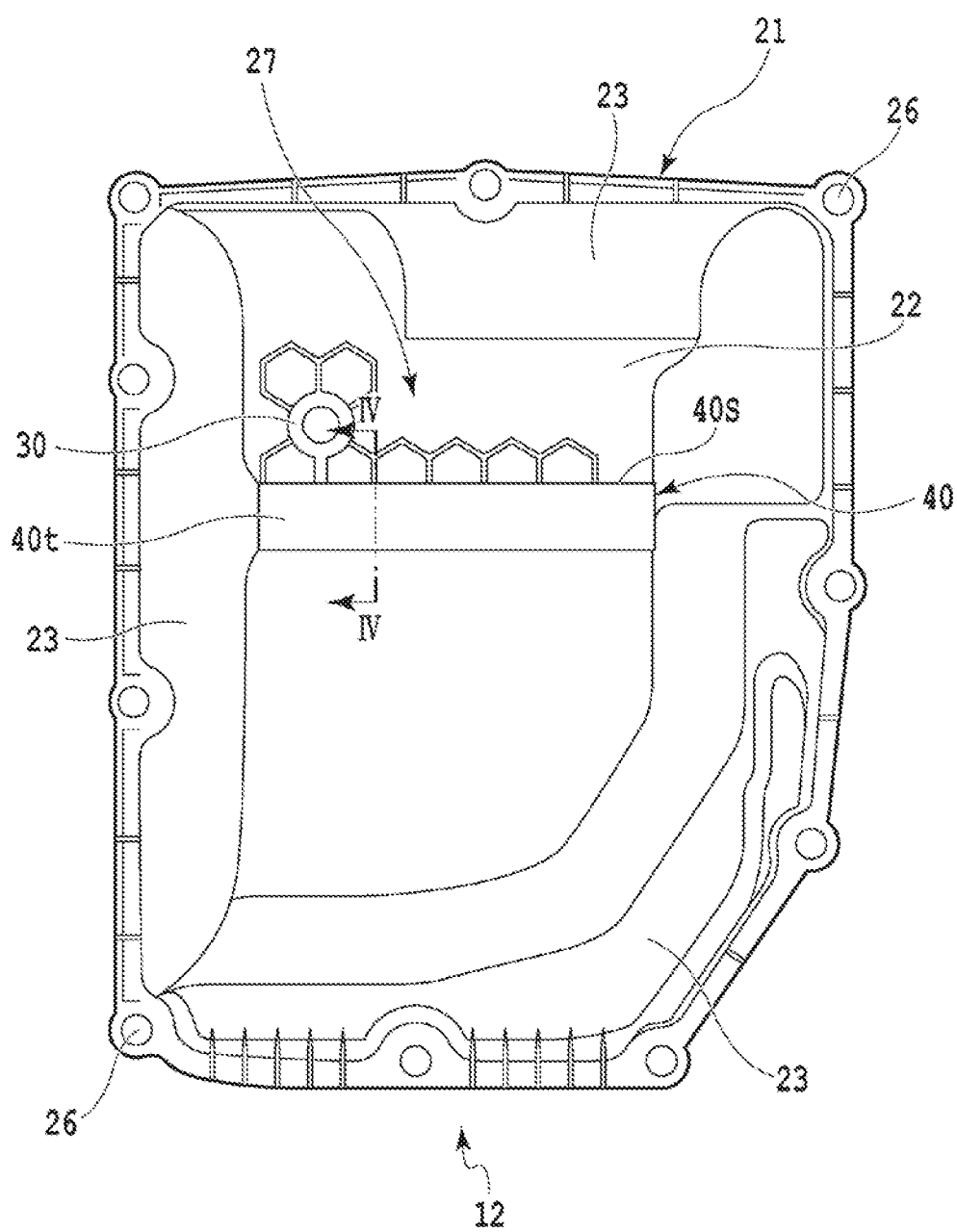
FIG. 2 is a front view of the side cover according to the embodiment.
Figure 3:
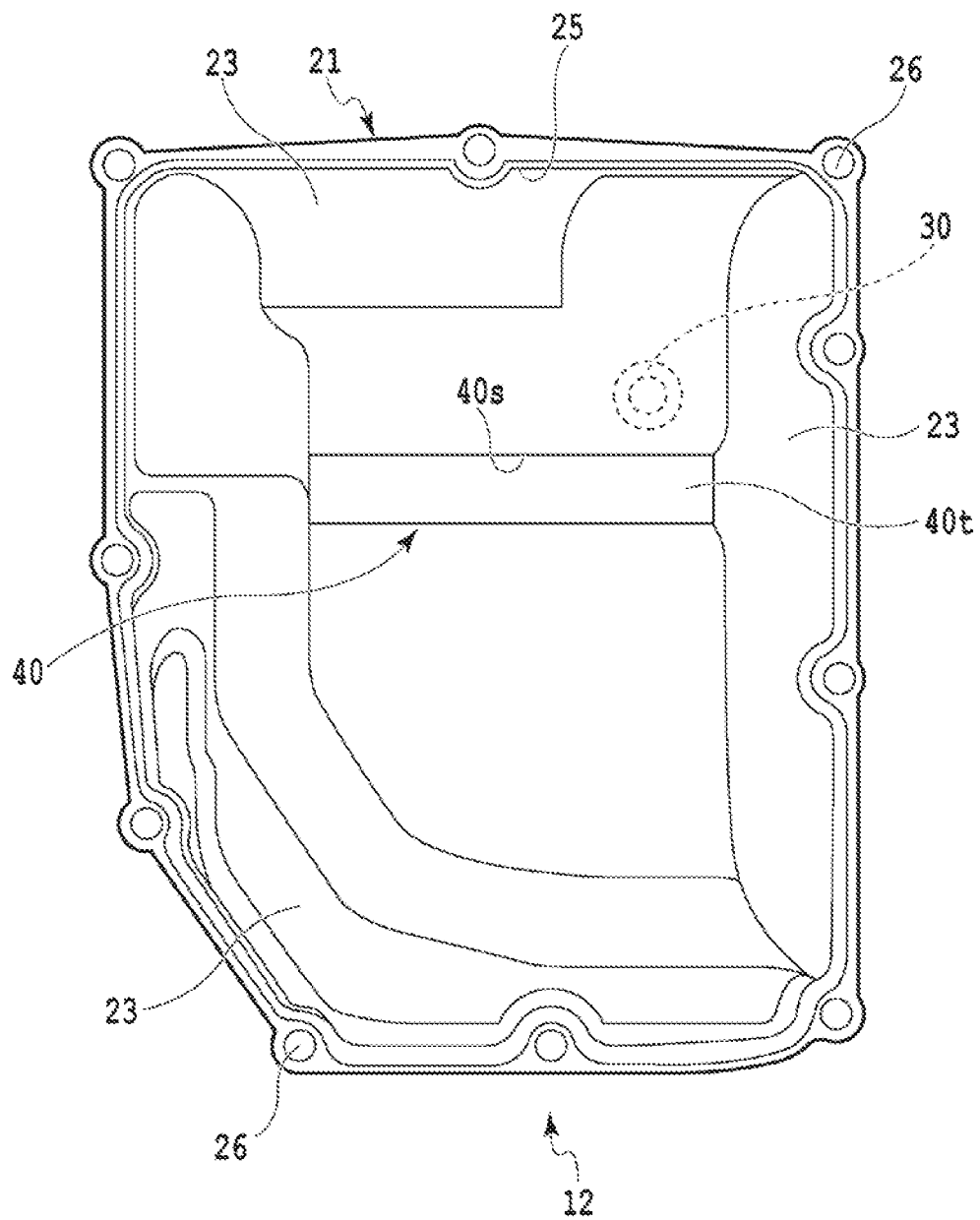
FIG. 3 is a rear view of the side cover according to the embodiment.

FIG. 2 is a front view of the side cover 12 and FIG. 3 is a rear view of the side cover 12 seen from inside thereof. The side cover 12 is formed of a synthetic resin in a predetermined shape by injection molding, and has a flat peripheral section 21, a wall surface 22 constituting an apex surface (a front end surface) that is substantially flat, and an inclined surface 23 configured to connect the peripheral section 21 and the flat wall surface 22. A concave groove 25 having an endless shape is formed in a back surface side (see FIG. 3) of the peripheral section 21, and a packing is mounted on the concave groove 25. A plurality of bolt holes 26 are formed in the peripheral section 21 outside the concave groove 25 at predetermined intervals, and the side cover 12 is fixed oil-tightly to a front end portion of the transmission case 11 by inserting and fastening bolts into the bolt holes 26 in the front end portion of the transmission case 11 via the packing. The side cover 12 is attached such that the wall surface 22 is aligned in the upward/downward direction in the vehicle.

Ribs 27 for reinforcement protruding from a surface of the wall surface 22 substantially throughout the surface within a range with no restriction are formed in a surface of the flat wall surface 22 of the side cover 12 to increase the entire strength of the side cover 12. When seen in the front view of FIG. 2, the ribs 27 of the embodiment have a honeycomb shape with mainly consecutive hexagonal shapes.

In addition, in the embodiment, a boss section 30 for a wire harness serving as a protrusion that protrudes forward from the vehicle and constitutes the foremost section of the transmission case 11 is formed to be shared with one of the ribs 27 having the honeycomb shape with consecutive hexagonal shapes. The boss section 30 has a thickness such that a predetermined strength is provided, and as shown in FIG. 1, protrudes from the wall surface 22 of the side cover 12 to a predetermined height. The boss section 30 for a wire harness is formed to guide a wire harness (not shown) configured to supply power to the transmission case 11, and the wire harness is inserted into a hole punched inside the boss section 30.

Figure 4:
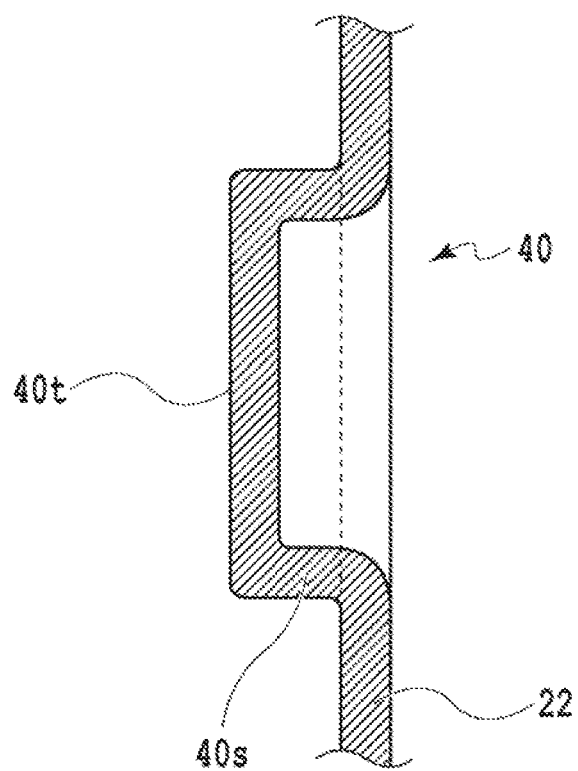
FIG. 4 is a cross-sectional view showing a fragile section according to the embodiment taken along line IV-IV of FIG. 2.

Further, in the embodiment, a fragile section 40 extending transversely in the lateral direction is formed to be disposed between the boss section 30 and an oil surface of the oil 16 stored in the oil storage section. As shown in FIGS. 1 and 4, the fragile section 40 in the embodiment is formed as a convex section in a rectangular parallelepiped shell shape protruding from the flat wall surface 22 to a predetermined height, and includes four sidewall surfaces 40s continuing to the wall surface 22 and an apex wall surface 40t continuing to the four sidewall surfaces 40s. Thus, the fragile section 40 formed as a convex section having a rectangular parallelepiped shell shape is disposed such that the sidewall surfaces 40s of a long side thereof traverse between the boss section 30 and the oil surface of the oil 16 stored in the oil storage section. Further, the four sidewall surfaces 40s and the apex wall surface 40t that form the convex section are set as the fragile section due to a decrease in structural strength without the ribs 27 for reinforcement being formed, whereas the wall surface 22 in which the convex section is formed has the ribs 27 having a honeycomb shape for reinforcement around the convex section.

Further, while not shown, the fragile section 40 may have a concave section having a rectangular parallelepiped shell shape recessed to a predetermined depth in a direction opposite to the flat wall surface 22 other than the above-mentioned convex section. Then, like the case of the above-mentioned convex section, the four sidewall surfaces and the bottom wall surface that form the concave section having the rectangular parallelepiped shell shape may be set as the fragile section due to a decrease in structural strength without the ribs 27 for reinforcement or the like being formed, whereas the ribs 27 having the honeycomb shape for reinforcement are provided around the concave section of the wall surface 22 in which the concave section is formed.

Further, the fragile section 40 may be formed as the wall surface 22 having a flat rectangular shape when seen in the front view of FIG. 2 in which the ribs 27 for reinforcement are not formed other than the above-mentioned concavo-convex shape, and may be set as a fragile section due to a decrease in structural strength.

Since the embodiment is configured as described above, when the vehicle collides with certain obstacles, the boss section 30 abuts the obstacle first and the wall surface 22 of a base section thereof is damaged and breaks. Then, when a direction of the crack generated from the broken portion is a downward direction in the upward/downward direction in the side cover 12, stress is distributed in a lateral direction by the fragile section 40 disposed between the boss section 30 and the oil surface of the oil 16 and extending transversely in the lateral direction, and new advance of the crack in the downward direction is blocked. Accordingly, the crack does not extend to a portion lower than the oil surface of the oil 16, and leakage of the oil is suppressed.

Figure 5:
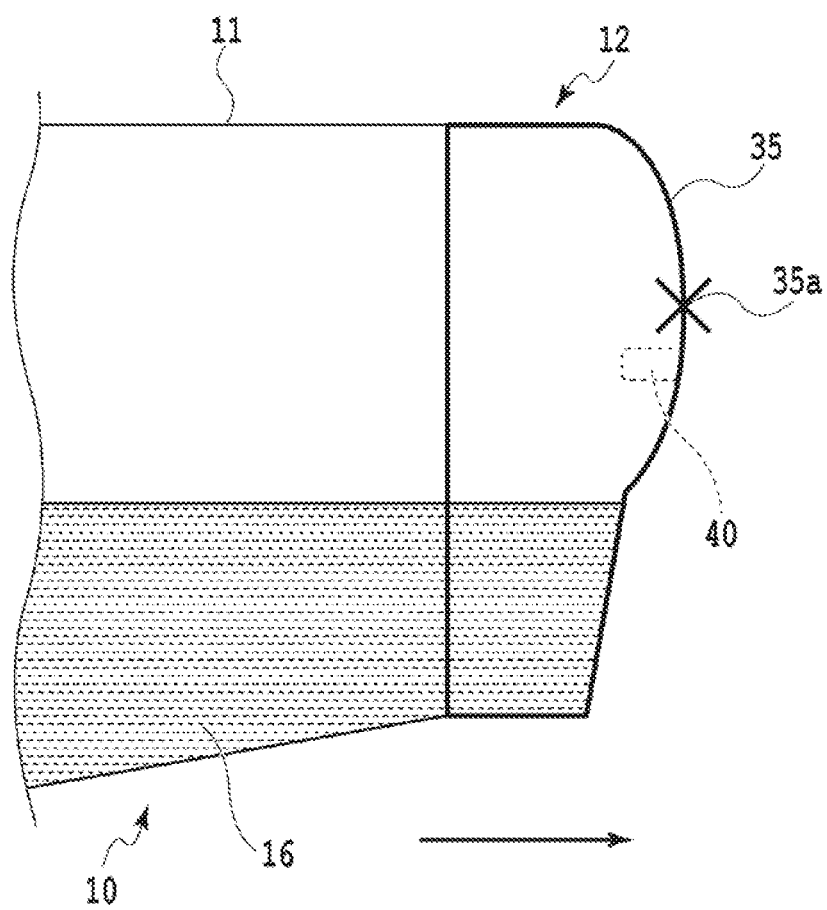
FIG. 5 is a side view schematically showing a transmission case for an automatic transmission to which a side cover according to another embodiment is applied.

Next, another embodiment of the present disclosure will be described below with reference to FIG. 5. Since the other embodiment is distinguished from the previous embodiment in that a shape of a protrusion is different therefrom, parts the same as the components of the previous embodiment are designated by the same reference numerals, and description thereof will not be repeated. That is, while the boss section 30 is used as the protrusion in the previous embodiment, in the other embodiment, an area disposed over the oil surface of the oil in the resin side cover 12 is a dome 35 having a round shape. The dome 35 has an apex section 35a (in FIG. 5, represented by x) at the central section, and the apex section 35a constitutes the foremost section of the transmission case 11. Further, the same fragile section 40 of the previous embodiment is formed immediately under the apex section 35a.

In the other embodiment, when the vehicle collides with an obstacle, the apex section 35a of the dome 35 abuts the obstacle first and the wall surface 22 of a periphery thereof is damaged and breaks. Then, when the direction of the crack generated in the broken portion is the downward direction in the side cover 12, stress is distributed in the lateral direction by the fragile section 40 disposed between the apex section 35a and the oil surface of the oil 16 and extending transversely in the lateral direction, and further advance of the crack in the downward direction in the dome 35 is blocked. Accordingly, the crack does not extend to a portion lower than the oil surface of the oil 16, and leakage of the oil is suppressed like in the previous embodiment.

Further, the protrusion according to the present disclosure is not limited to the above-mentioned boss section 30 for a wire harness or the apex section 35a of a dome and may be formed at an appropriate position on the surface of the wall surface 22 of the resin side cover 12 as long as the protrusion allows such a relationship between the fragile section 40 and the oil surface of the oil 16 to be satisfied.

Further, while the above-mentioned ribs 27 for reinforcement have a honeycomb shape to improve the strength of the side cover formed of a synthetic resin, the ribs are not limited to a honeycomb shape and may be ribs having a lattice shape extending in the longitudinal direction and the lateral direction, and the lattice shape may be inclined at a predetermined angle such as 45° or the like and further may have another shape combining triangular shapes.

Hereinabove, while various embodiments of the present disclosure have been described, the scope of the present disclosure is not limited to the above-description, and instead is set forth in the following claims, and all modifications are intended to be included within the scope of the description and equivalents thereof.

What is claimed is:

1. A resin side cover for a transmission case, the resin side cover configured to be mounted on a vehicle and disposed on the transmission case at a front side of the vehicle, the resin side cover constituting a vehicle front side surface section of an oil storage section in which oil is stored in the transmission case, the resin side cover comprising:
   a protrusion disposed above an oil surface of the oil stored in the oil storage section, the protrusion protruding toward the front side of the vehicle and constituting the foremost section of the transmission case; and
   a fragile section disposed between the protrusion and the oil surface of the oil,
   wherein a longitudinal axis of the fragile section extends transversely in a lateral direction across the resin side cover.

2. The resin side cover for the transmission case according to claim wherein the fragile section is a convex section having a shell shape protruding from a wall surface of the resin side cover to a predetermined height.

3. The resin side cover for the transmission case according to claim 2, wherein the convex section having the shell shape has a rectangular parallelepiped shape.

4. The resin side cover for the transmission case according to claim 1, wherein the fragile section is a concave section having a shell shape recessed in a wall surface of the resin side cover to a predetermined depth.

5. The resin side cover for the transmission case according to claim 4, wherein the concave section having the shell shape has a rectangular parallelepiped shape.

6. The resin side cover for the transmission case according to claim 1, wherein the resin side cover includes reinforced ribs formed on a wall surface of the resin side cover, and
   the fragile section has a flat wall surface on which the reinforced ribs are not formed.

7. The resin side cover for the transmission case according to claim 6, wherein the fragile section has a rectangular shape when seen in a front view.

8. The resin side cover for the transmission case according to 1, wherein the protrusion is an apex section of a dome.

9. The resin side cover for the transmission case according to claim 1, wherein the longitudinal axis of the fragile section extends transversely between the protrusion and the oil section.

10. The resin side cover for the transmission case according to claim 1, wherein the longitudinal axis of the fragile section extends transversely between opposite side surfaces of the resin side cover.

* * * * *